Feb. 11, 1958 W. KULL 2,822,838
ROTARY MACHINES FOR THE SHREDDING OF WOOD INTO SHAPED PARTICLES
Filed Aug. 12, 1953 3 Sheets-Sheet 1

United States Patent Office 2,822,838
Patented Feb. 11, 1958

2,822,838

ROTARY MACHINES FOR THE SHREDDING OF WOOD INTO SHAPED PARTICLES

Walter Kull, Freudenstadt, Germany, assignor, by mesne assignments, to Allwood Incorporated, Glarus, Switzerland, a corporation of Switzerland Application August 12, 1953, Serial No. 373,779

5 Claims. (Cl. 144—221)

My invention relates to machines for shredding wood into chips, shavings, foils or similar shaped particles for the manufacture of boards, panels, plies and other wood-composition products.

It has been recognized that the mechanical properties, workability, or surface appearance of structural materials, panels or veneers of wood-composition products can be greatly improved by producing them from intentionally shaped wood particles especially produced for the particular purpose of the final composition product. Various devices have been proposed for obtaining such particles from logs, flitches or other wood pieces in such shapes as thin flakes, foils or scales, oblong chips with pointed ends, elongated rectangular or lozenge-type shavings, needle-like splinters, slightly twisted or helical fibers and the like. Attention has also been given to cutting the wood in such a manner as to have the longitudinal direction of the severed particle extend closely or as nearly as feasible in the main direction of the natural fiber growth for utilizing in the final composition product the high strength inherent in the individual longitudinally fibered particles.

The machines heretofore available for the production of such particles may be ranged into two general types.

Those of the first type operate with rotating tools and hence are suitable for the large-scale production of particles in a continuous operation and with a high power capacity. However, due to the chiselling or adzing cut of such machines, the quality of the resulting particles leaves much to be desired.

The machines of the second type are of the flat-slicing type, that is the wood pieces to be shredded are cut along a plane surface much in the manner of the known veneer or wood-foil slicers. These machines can be given a design that secures a dragging or slicing cut at an angle to the feed direction thus producing particles superior to those obtainable with an adzing cut. On the other hand, these machines are less suitable for mass production.

It is an object of my invention to devise machines for the production of shaped wood particles that combine the advantages and avoid the deficiencies of the two above-mentioned types of machines. More particularly, my invention aims at providing a machine which operates with a slanted, dragging cut that progresses gradually in a peeling or slicing manner but which nevertheless has its cutting knives mounted on, or combined with, a rotary tool unit so as to afford a continuous operation as well as the other advantages of the known rotary type machines.

To this end, and in accordance with my invention, I provide a revolvable tool carrier or rotor whose peripheral surface, actually or geometrically determined by the revolution of the knife foot points, is a body of revolution of a generatrix line (extending within an axial plane of the rotor), and I dispose on this surface a number of peripherally spaced cutting knives, each of substantially flat shape and each having a cutting-edge radially projecting inwardly or outwardly from that surface. In contrast to the known rotary cutters, however, I give one of the two characteristic lines of each knife blade (namely the line of its cutting edge and the pertaining generatrix line of the rotor) a straight shape while giving the other line a curved shape; and I let the cutting edge extend substantially parallel to the line of intersection of the knife-blade plane with the peripheral rotor surface.

According to another feature of my invention, the cutting edge of each knife blade is straight, and the pertaining generatrix line of the rotor surface is curved and substantially parallel to the resultant hyperbolic envelope curve of the totality of the cutting edges.

The foregoing and other objects, features and advantages will be apparent from, or will be mentioned in, the following with reference to the drawings in which:

Fig. 9 being a side view, Fig. 10 a front view and Fig. 11 a top view of a cylindrical rotor; while Figs. 12, 13 and 14 represent a frusto-conical rotor by a side view, a front view and a top view respectively;

The invention will be more readily understood if one first realizes the difference between a dragging or slicing cut and a chiseling or adzing cut. If a knife blade is moved against a wood piece to be sliced, the knife edge ordinarily cuts simultaneously over its entire width and exerts upon the material a pressing impact which chisels a chip from the material. This is an adzing cut. In contrast, if the blade edge is set at an angle, the cutting action commences at the most forward point of the edge and extends gradually over the width of the edge thus producing a dragging or slicing cut. Hence both kinds of cutting action can be obtained with such cutting devices.

Figure 1:
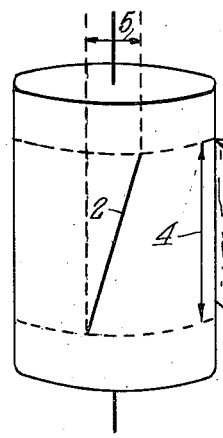
Fig. 1 is a schematic axial view of a rotary cutting device in accordance with a known principle.

If the slanted blade is curved about a cylinder, a rotary cutter will result as shown in Fig. 1. If the material Z is advanced toward the cutting blade, or vice versa, a somewhat gradually progressing cutting action will be obtained. Now, however, the angular relation of the edge 2 to the wood piece is not the same at all points of the edge. This angle is larger toward the ends of the blade by an amount increasing with the length of the blade and increasing also with the amount of inclination, denoted by the double-headed arrow 5, of the edge 2 relative to the cylinder axis or relative to the axial width 4 of the cylinder determined by the rotation of the knife edge. Due to these angular divergencies, and especially in machines where the peripheral surface of the rotor is closed and serves as a pressure abutment against which the wood pieces are driven in the direction of the arrows 5′, the wood pieces are caused to shift or wobble. This effects the cutting operation to such an extent that it may make it virtually impossible to use such a machine for producing accurately shaped and sufficiently uniform shavings, scales or chips of the desired slight thickness.

How the invention obviates such deficiencies will now be shown, first with reference to shredding machines with a substantially closed rotor surface which, as in the case of Fig. 1, serves as an abutment for the wood piece and determines the thickness of the severed particles, such rotors being usually provided with slots for accommodating the knife blades. The invention, however, is also applicable to shredders without a bodily closed peripheral rotor surface in which the amount of feeding movement of the wood piece toward the rotating blades determines the thickness of the particles.

Figure 2:
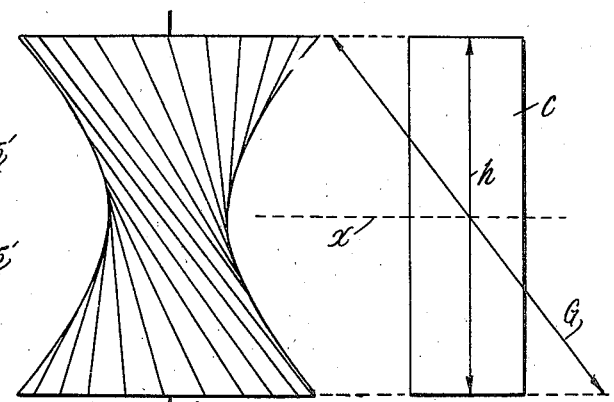
Fig. 2 is an explanatory illustration of a hyperbolic body of revolution and shows its development from the rotation of a straight edge-line in a machine according to the invention of the type represented in the subsequent figures.

According to the invention, and as mentioned, it is necessary to give the geometric or structural generatrix line of the rotor structure a curved shape (the generatrix being here always understood to extend within an axial plane of the rotor). This requirement of the invention is based upon the geometrical fact that a straight line extending askew to an axis of rotation and tangential to a cylindrical or conical surface produces a hyperboloid or a similar body of rotation when revolving about that axis. According to geometrical principles, the peripheral surface of a hyperboloid is the locus of two families of straight lines, each line extending askew to the other lines of the same family. One of these families of straight lines is shown in Fig. 2, except that for lucidity of illustration only the lines visible from the observer side of the hyperboloid are indicated. It may be mentioned that, while in practice a rotor according to the invention covers only a small portion of a hyperbolic body of rotation, Fig. 2 shows the hyperboloid axially extended beyond the practically applicable limits in order to facilitate understanding the geometrical aspects of the invention.

In Fig. 2, the rectangle C represents the front view of a cylinder rotatable about its axis. A straight line G in the plane of illustration touches the surface of the cylinder C tangentially at the midpoint of the cylinder height $h$. The length of the straight line G is limited by the distance between the cylinder ends. Assume that cylinder C and the straight tangential line G are incrementally turned about the cylinder axis each time an equal angular amount, and that in each individual position of the line G this line is projected onto the plane of illustration. Then, when the cylinder C has completed one full revolution about its axis, the hyperboloid shown in the left portion of Fig. 2 will result. The projected straight lines belong to one of the above-mentioned two families. The same result is obtained if the line G is given the opposite slant. Then the projected lines defining the hyperboloid belong to the second family. In the foregoing consideration, as well as in the modifications described hereinafter, the $y$ axis is the axis of rotation of a cylinder, cone or other body of revolution with respect to which axis a tangential straight line, corresponding to line G, extends in oblique relation. The axis $y$ is also the conjugate axis of the hyperbolas (generatrices) which appear on the plane of illustration. The focal points of these hyperbolas lie on the $x$ axis (transverse axis). It may be mentioned that these conditions may become somewhat modified if, as described in the following, the peripheral surface of the rotor is given a shape derived from hyperbolas.

Figure 3:
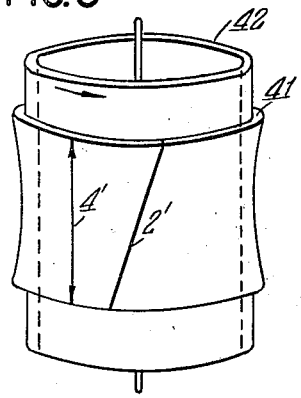
Fig. 3 is a schematic and perspective view of a device according to the invention with a hyperbolically surfaced rotor.
Figure 4:
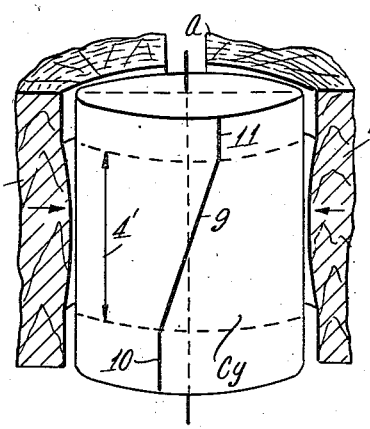
Fig. 4 is a schematic perspective view of another embodiment according to the invention.
Figure 5:
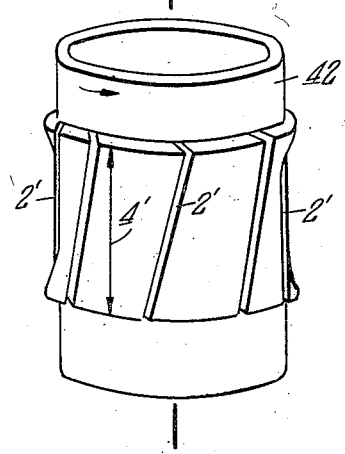
Fig. 5 is a more realistic perspective view of the same device, Fig. 6 a top view, and Fig. 7 a partial cross section.
Figure 6:
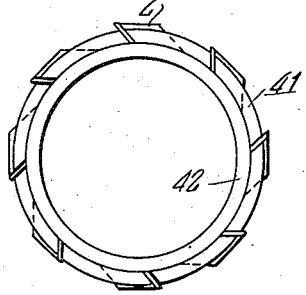

The foregoing geometric considerations are applied according to the invention to shredding machines with bodily closed peripheral rotor surfaces by giving these surfaces a hyperboloidal or similar shape adapted to the requirements of the particular machine, although this shape need be applied only to the annular portion of the rotor structure which carries the knives, i. e. to the zone determined by the totality of the tip circles of the active knife edges. This zone is indicated in Figs. 3, 4 and 5 by a double-headed arrow 4'. When the knife-carrying rotor portion is given such a curved surface design, the rotor may be equipped with knife blades whose cutting edges extend linearly in the sense of the straight line G in Fig. 2; and such machines then operate with a dragging cut despite the provision of straight knife edges. The best suitable design of such a machine depends upon the shape and dimensions of the rotor, the degree of angular setting of the cutting edges, and the axial width of the annular zone defined by the rotating edges. This will first be elucidated with reference to a machine with a structurally closed peripheral surface which serves as an abutment for the wood piece to be shredded and hence is subjected to the feed pressure. Shredders with an open peripheral surface (shell-free rotors) will be described in a later place.

Figure 7:
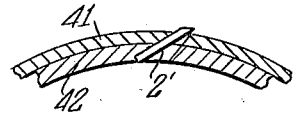

Figs. 3, 4 and 5 show the application of the above-explained principle to a cylindrical cutter. If a cylinder as shown in Fig. 3, inclusive of the slanted knife with edge 2', is turned once about its axis, the edge 2' defines the hyperboloidal surface shape of the edge-circle ring 4', shown in Fig. 3. A ring-shaped blade carrier 41 having such a surface is shown mounted on a cylinder body 42 so that it projects radially from that body. The ring portion 41 is equipped with the desired number of plane knives 2' with straight edges, each knife 2' having the indicated slanting position. To accommodate the knives, of which a total of eight are shown in Fig. 5, the ring-shaped blade carrier is divided into an equal number of peripherally sequential portions, each knife being mounted in a gap between two successive portions (Fig. 7) in the same manner as apparent from Fig. 1. Each knife edge projects only slightly from the hyperboloid surface of the ring portion 41. Each knife edge extends parallel to the straight tangential intersection line of the blade plane with the peripheral hyperboloid surface. Such a machine also avoids the deficiencies of the known rotary machines explained in the foregoing with reference to Fig. 1.

The shell structure 41 of the cylindrical cutter shown in Fig. 3 need not project from the cylindrical surface 42 of the structure; the thickness of the shell being made the same in the hyperboloidal middle portion as in the cylindrical end portions. Note Fig. 17 in this relation. This permits an appreciable simplification and a saving of material in the manufacture of the rotor. Such a machine may also be designed for the shredding of material which is advanced toward the rotor shell from within its interior, for instance, by feeding the work to be shredded parallel to an axial plane toward cutting knives whose edges project from the shell toward the interior of the rotor. It may be mentioned that the corresponding ideal hyperboloid and hence the hyperbola portions shown should be somewhat different depending upon whether the shredder is to be used for advancing the material from without or from within the shell. The slight incongruence, invisible on the scale of the drawings, results from the difference between the radii from the axis to the inner surface of the drum and to the outer surface respectively.

The suitable hyperbolic shape may be determined by calculation. However, the manufacturing principle elucidated presently with reference to Fig. 4 may also be employed. The cylinder Cy carries on its middle portion 4' a knife blade which extends in an oblique relation to the axis of revolution. The knife edge is schematically shown at 9. The peripheral end zones of the cylinder are provided with knives whose edges 10 and 11 are parallel to the axis and are an immediate continuation of the edge 9 without any difference in height and angular setting. Assume that the cylinder with the knife edges 9, 10, 11 is revolving and that two members B and B', which are only roughly shaped from soft wood or a readily machinable artificial material, are advanced from both sides toward the rotor. Then the rotating knife edges will cut out of the members a model whose inner surface has the desired hyperboloidal shape in its middle portion and a cylindrical shape in its two end portions. The shape of this model is then transferred to the raw casting or roughly molded body from which the final rotor is to be manufactured. The transfer may be effected with any suitable copying means known and available for such purposes, for instance, with the aid of a tracing machine tool. In a similar manner, the desired accurate shape can be produced and transferred to interiorly located members for producing rotors with interiorly located knife edges.

For manufacturing a cutter according to the invention, the following method may also be used. A roughly shaped casting or molding of the rotor is placed in rotation and is at first machined to the accurately dimensioned cylindrical shape by means of a cutting tool operating parallel to the axis of revolution. Thereafter the cutting tool is passed along the rotor in the slanted position corresponding to the angular setting of the knife edges, that is in the sense of the oblique position of the straight line G in Fig. 2. When producing an interior type cutter, an analogous machining method may be used. That is, the hyperboloidal middle portion (tip-circle ring) and, as the case may be, any cylindrical end zones are machined only by the correspondingly guided cutting tool. This machining is to start from a cylindrical hollow of the rotor whose diameter is smaller than the distance between the crest points of the two hyperbolas.

The hyperboloidal or similar shaping of the knife-carrying rotor zone is likewise not limited to cutter rotors which in their other parts, or viewed as a whole, are substantially cylindrical. That is, the hyperboloidal design of the knife zone may generally be applied with rotors of any curved peripheral surface, provided the particular conditions are properly taken into account. For instance, with rotors of a generally straight-conical shape having slantingly set knives with straight edges, the design of the blade-carrying rotor portion in accordance with the invention results in a rotor contour determined by the conical shape as well as by an additional slant of the knife edges relative to the axis of rotation $y$, this additional slant being due to the basic conical shape of the rotor and extending in a plant different from that of the aforesaid angular setting of the knife edges. This will be explained with reference to Fig. 8.

Figure 8:
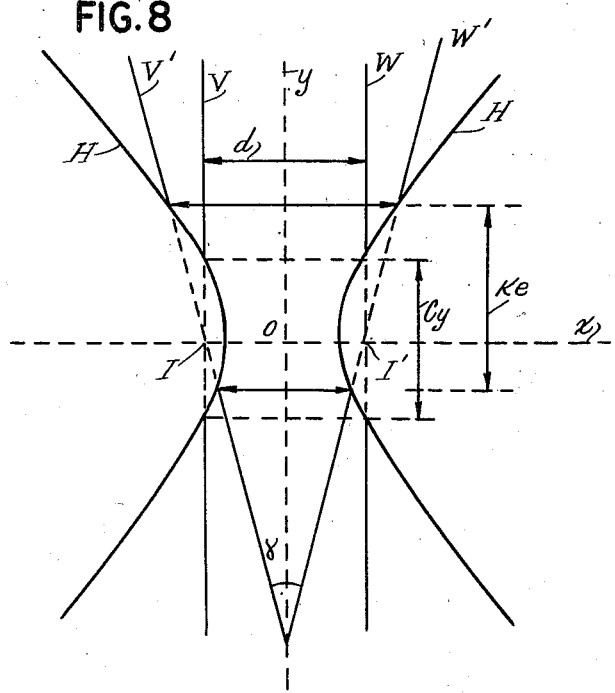
Fig. 8 is an explanatory geometric diagram relating to embodiments shown in subsequent figures.

Fig. 8 shows two hyperbolas H and H′ resulting from the cross-sectioning of a rotor in a plane of illustration determined by the axis of rotation $y$ and the transverse axis $x$. If the rotor shape is basically cylindrical, then a portion Cy of the cylinder, having the diameter $d$, is hyperboloidal as explained in the foregoing. Hence, the distance Cy designates the position and axial width of the tip-circle ring of a pertaining arrangement of knife edges whose particular angle of setting (oblique angle or slant) corresponds always to a definite dimensioning of the hyperboloid. Now assume that the two parallel vertical lines (V and W), which in the drawing represent the cylinder section, are turned about their respective intersection points I and I′ with the $x$ axis to the position V′ and W′, so that those lines intersect the $y$ axis at the same point P thus forming together the angle $\gamma$. Then the intersection points of each of these two lines with the hyperbolas are shifted and assume positions different from those previously occupied by the intersections of the two vertical parallel lines V, W of the cylinder section with the same respective hyperbolas. The axial width of the resulting annular zone now determined by the totality of the tip circles of corresponding knife edges is designated by Ke. It should be understood, however, that the distance Ke in Fig. 8 is intended to show only the general axial displacement and modification of the hyperboloid shape occurring with a basically conical rotor as compared with a basically cylindrical rotor. The exact position and accurate width of the annular knife zone of a conical shredder and the precise shape of the inwardly curving surface over the axial width of the annular knife zone cannot be determined merely from Fig. 9. For determining these particularities the following conditions are to be taken into account.

Figure 9:
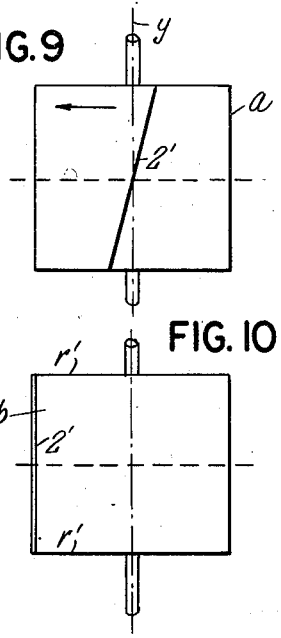
Figs. 9 through 14 illustrate further embodiments of the invention.

Fig. 9 shows a cylindrical rotor revolvable about an axis $y$. An axis $x$ is shown to intersect the axis $y$ in the plane of illustration exactly at the center point of the cylinder. A third axis $z$ is assumed to extend through the same center point perpendicularly to the plane of illustration and is entered in the corresponding side view shown in Fig. 10. The cylinder carries a knife blade of plane shape whose edge 2′ is linear and extends in oblique relation to the axis of rotation. In the corresponding top view of Fig. 11, the $y$ axis passes through the center point perpendicularly to the plane of illustration.

Figure 12:
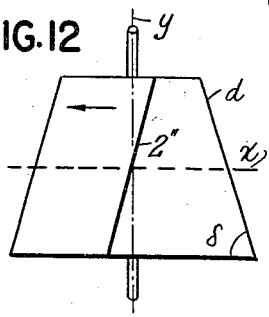
Figure 13:
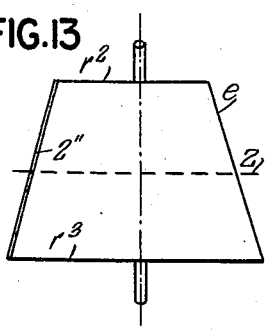
Figure 14:
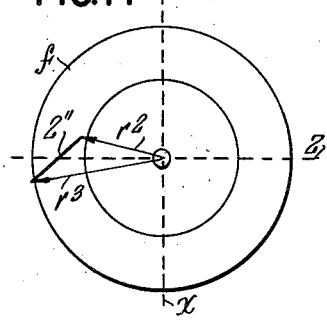

Figs. 12, 13, 14 represent analogous illustrations of a rotor shaped as a truncated cone with a straight generatrix. The height of the conical rotor corresponds to the height of the cylinder, and the diameter at the center of the cone (on the $z$ axis) is equal to the diameter of the cylinder. The angle of inclination of the conical surface relative to the base is denoted by $\delta$. The knife edge 2″ was placed against the conical surface before it was placed into a slanted position analogous to the angular setting of the edge 2′.

Figure 10:
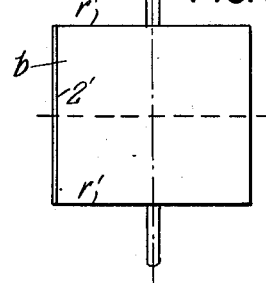
Figure 11:
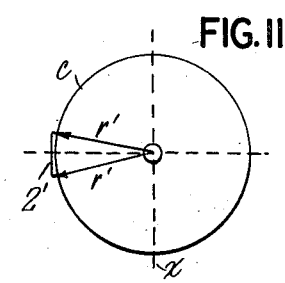

In Figs. 11 and 14, the two straight lines which connect the two end points of the respective knife edges with the axis of rotation and extend perpendicularly to that axis represent the radii of the concentric tip circles traversed by the end points during the revolution of the structure about the axis $y$. With the edge 2′ placed against the cylinder in the above described manner, the radii $r_1$ and $r_2$ of the two end points of the knife edge are larger than the cylinder radius and are equal to each other. The radii pertaining to all other points of the edge 2′ are the smaller the more closely these points are spaced from the midpoint of the edge, this midpoint being assumed to have a radius equal to the cylinder radius or to be somewhat larger by the amount of the radial projection of the knife. In Fig. 10, this radius of the edge midpoint lies in the plane of illustration. If the corresponding radii of all other points along the edge 2′ are turned about the $y$ axis into the plane of illustration of Fig. 10, then the peripheral points of the respective radii define the crest portion of a hyperbola with two equal branches appearing in the plane of illustration. This shows that there is a complete congruence of the two parts of the single-sheet rotational hyperboloid resulting from a cross section in the $x-z$ plane within the edge portion of a cylindrical cutter, for instance as shown in Fig. 3.

With a truncated cone as shown in Figs. 12, 13 and 14 having a knife 2″ slanted and also ablique relative to the axis $y$ of the cone, the radius $r_2$ connecting the upper end point of the edge with the $y$ axis, of course, is smaller than the corresponding radius $r_3$ of the lower end point. The radii $r_2$ and $r_3$ of the edge end points are larger than the respective radii of the basic cone-shape in the same respective planes. The radius connecting the midpoint of the edge 2″ with the axis $y$ is equal to the radius of the cone in the $x-y$ plane (Fig. 13) or is longer than the latter radius by the amount of the knife setting. Assume that the radii pertaining to all points along the edge 2″ are turned into the plane of illustration of Fig. 13 i. e. into the $y-z$ plane, and that the outer end points of these radii are interconnected by an envelope curve, then this envelope curve determines the shape and axial width of the annular rotor zone occupied by the knives for a basically conical cutter of a given cone angle and for a given middle radius of the truncated cone not yet finished by machining to the final accuracy desired in accordance with the invention. It may be mentioned that the curvature thus obtained can no longer be considered to be a portion of a unitary hyperbola. The curvature represents the resultant of hyperbolas of different sizes which continuously merge into each other; and it depends upon the conditions of the particular case whether or not any crest point of such a curve lies within the axial width of the annular rotor zone occupied by the knives. The proper shape of the annular rotor zone, however, may again be determined by the method described with reference to Fig. 4.

In the illustrations concerning hyperboloidal rotor shapes (commencing with Fig. 2) the hyperboloidal or analogous shape extending over the axial width of the active annular rotor portion is purposely shown exaggerated. In practice, the curves are considerably flatter due to the fact that the cylindrical or conical cutter rotors have relatively large diameters. This is also the reason for the fact that the rounded shape of the rotor does not make itself felt over the small width of the particles cut from wood pieces fed toward the rotor along an axial plane. Besides, the rotor is often also equipped with pre-slitters which work ahead of the peeling knives and which slit the workpiece transverse to the direction of growth. Other slitting or notching members may be similarly mounted for determining or modifying the length and shape of the severed particles, for instance, when the length of the individual particle is not to exceed a given magnitude. Due to these devices, the rounded shape of the rotor surface as well as the hyperboloidal or similar shape of the knife-carrying annular portion are hardly noticeable over the length and width of chips or shavings of the kind used, for instance, in the manufacture of wood-composition products, for the surfacing and ornamental improving of light-weight boards and panels of various kinds or as small-size veneers. On the other hand, there are cases where it is desired to produce longer shavings or small-size veneers or where, for instance, when producing very thin foil materials, the severing of individual cells in the longitudinal direction of the wood is to be avoided. Such desiderata can be satisfied with machines according to the invention by composing the knife arrangement of the rotor of two or more portions as will be described with reference to Figs. 15 and 16.

Figure 15:
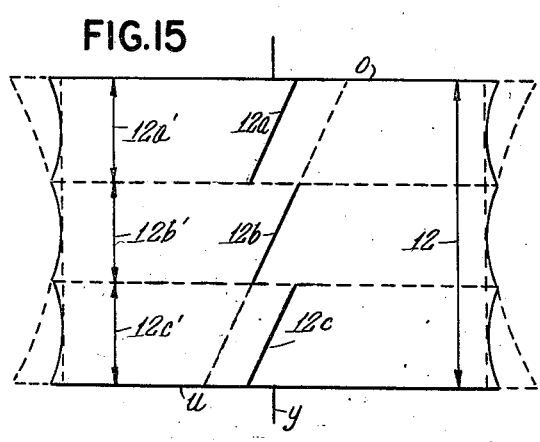
Figs. 15 to 18 illustrate schematically four other embodiments of the invention with curved rotor surfaces.

Fig. 15 shows the active annular portion of a rotor in which the annular zone has a total width indicated by the double-headed arrow 12. Entered in broken lines is a knife edge arrangement as discussed in the foregoing. With such an arrangement the cutting edge would extend from the upper limit plane $o$ of the annulus over the entire width 12 to the lower limit plane $u$, and the inclination of the edge relative to the rotational axis $y$ would be in accordance with the hyperboloidal shape also shown by broken lines over the entire width 12 of the ring. According to a further feature of the invention, however, this edge ($o$ to $u$) is divided, for instance, into three portions 12a, 12b, and 12c which, while maintaining the given inclination, are so arranged over the width of the ring that the pertaining partial rings 12a', 12b', and 12c' are immediately consecutive or overlap each other a slight amount. Advantageous is the arrangement shown in Fig. 15 according to which the midpoints of the three edge portions 12a, 12b, 12c lie in a common axial plane through the axis of rotation (this plane being perpendicular to the plane of illustration). However, other arrangements of the three edge portions are also applicable. In this manner, each of the three consecutive ring portions has its own hyperboloidal shape. With a cylindrical cutter having a subdivision into three edge portions, a cross section in the plane of the $x$—$y$ axes (within the plane of illustration) comprises the crest portions of three congruent hyperbolas each with hyperbolic branches of equal lengths, and these hyperbolas are displaced in the direction of the $y$ axis by ⅓ of the total width 12 of the ring. The focal points of these three hyperbolas and, as the case may be, the focal points of any continuing hyperbolas are therefore located on a straight line in the longitudinal direction of the wood material to be shredded. It is apparent that by virtue of such a subdivision and arrangement of the edge portions, longitudinally plane particles may be peeled from rather long pieces of material. These particles have a slightly wavey shape in the lengthwise direction. This, however, is much less pronounced in practice than appears from the purposely exaggerated illustration. A comparison of the sectional hyperbola pertaining to the entire width 12 with the hyperbolical sections pertaining to the three edge portions reveals the considerable advantages of such an arrangement which obviously also determines the shape of the pertaining ring portion of the rotor, if such a ring portion is provided on a peripheral surface of a more or less closed design.

Figure 16:
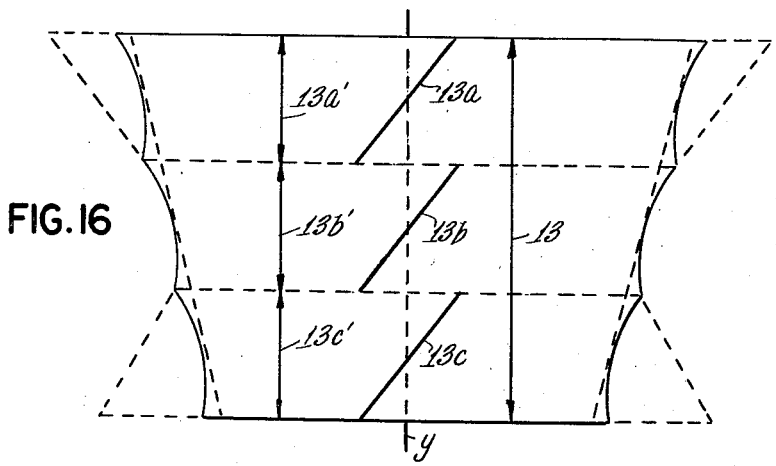

Fig. 16 shows a similar subdivision and arrangement of the cutting edges with a frusto-conical ring portion of a basically conical shredder. The total width of the ring is denoted by 13. The edge portions 13a, 13b and 13c correspond to the respective ring portions 13a', 13b', and 13c'. Each of these rings has a hyperboloidal surface as explained in the foregoing. Shown in broken lines is the hyperbolical sectional curve (generatrix) which would correspond to a knife edge (not shown in Fig. 16) of the same inclination but extending over the entire width 13. For the purpose of explanation, the illustration of Fig. 16 is based upon a greater slanted position of the edges relative to the $y$ axis than will occur in practice. The illustrated curves, for simplification, are drawn as hyperbola sections without considering the slight curve modifications explained in the foregoing with reference to Figs. 9 to 14. Each ring portion 13a', 13b' and 13c' has its own curvature which, as a rule, differs from the curvature of the adjacent ring portions to such a slight degree that it is hardly possible to make the difference apparent in a drawing of the present scale. It is nevertheless preferable to take these slight differences into account when designing a shredder of the customary size if the advantages afforded by the invention are to be fully utilized.

Wood particles of the kind here involved, such as shavings, scales or midget veneers, are often required to be pourable, that is to have a rather short length, for instance, of not more than a few centimeters. According to another feature of the invention the machines for producing such pourable particles, designed generally in accordance with the principles explained with reference to Figs. 15 and 16, are preferably given an axial width of the individual ring portions (12a', 12b', 12c' or 13a', 13b', 13c') equal to the desired length of the particles. The pre-slitters are then so distributed over the entire length of the wood pieces to be shredded that they are located on the respective borderlines between the adjacent ring portions of the rotor. These pre-slitters, acting ahead of the knife edges, then secure a correct length of the severed particles. Additional pre-slitters may be disposed between those just-mentioned if a further reduction in the length of the particles is desired.

The features explained in the foregoing with reference to the illustrations commencing with Fig. 8 are analogously applicable with shredding machines of the internal type, that is with machines in which the wood pieces are fed from the interior of the rotor toward the inner peripheral rotor surface. While further, in the foregoing, reference was made to the advantages of shredders with a bodily closed peripheral surface for receiving the axial feed pressure of the wood pieces to be shredded (see Fig. 1), the invention is likewise applicable to shredders in which the goemetrical rotor surface is not bodily closed or in which a closed surface is only incompletely available. Such shredders may be used if no exacting requirements are placed upon the accuracy, uniformity and thinness of the particles to be produced. These so-called "open" shredders have a somewhat smaller power consumption than those with a bodily closed peripheral surface because the friction between the wood pieces to be shredded and the rotor surface is eliminated. On the other hand the "open" shredders, in comparison with closed-surface shredders, must be provided with additional means for securely fastening the wood pieces and for advancing them toward the knives at a rate determined by the progress of the shredding operation, because the proper rate of feed cannot be obtained simply by advancing the pieces against a pressure-receiving surface of the rotor. In some cases the "open" machines also permit the passage of unshredded waste pieces through the gaps between the knives, and there is an appreciable limitation as to the wood material that can properly be handled on such a machine. For one or the other of these reasons, the advantages of the invention are often not as fully attainable as with closed-surface rotors. However, the invention, correspondingly adapted, is also applicable with shredders in which a peripheral surface of a body of revolution is not available for receiving the feed pressure of the material, or in which a peripheral rotor surface, serving a different purpose, is located too far behind the knife edges to serve as an abutment so that the geometrical peripheral surface of the rotor is determined by the rotation of the knife blades rather than by actual structure.

With machines of these "open" types, the invention may be applied with the aid of straight-edged knives on the principles explained above with reference to the knife edge 2' in Figs. 1, 3, 5 and the knife edge 9 in Fig. 4. Of course, when a peripheral rotor surface is not bodily present, the hyperboloidal or similar shape mentioned in the foregoing is not incorporated in the rotor structure but is only discernable geometrically. However, when providing pre-slitters and/or other elements for determining or affecting the length or shape of the particles, or when providing other customary devices, for instance, those for feeding and positioning the wood material, for discharging the particles and the like auxiliaries, the above-explained geometrical principles must be accurately taken into account in the same manner as set forth in the foregoing. In machines of the "open" type, the knives may also be subdivided and arranged over the total length of the edge zone as is explained in the foregoing, for instance, with reference to the edge portions 12a to 12c and 13a to 13c in Figs. 15 and 16.

Figure 17:
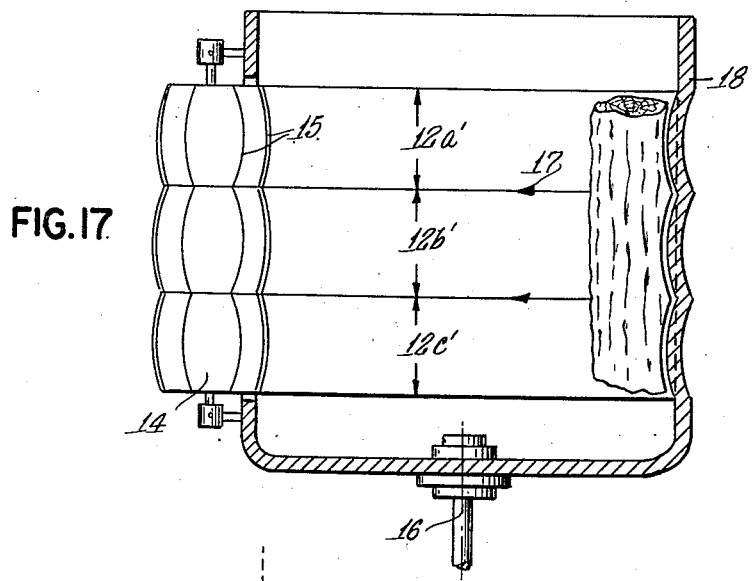
Figure 18:
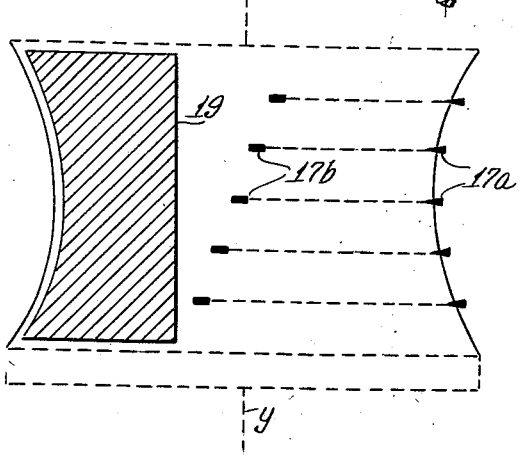

Figs. 17 and 18 illustrate examples of machines embodying the just-mentioned modifications. According to Fig. 17 a hollow rotor of generally cylindrical shape is designed for feeding the wood pieces Z from the interior toward the peripheral inner surface, similar to the internal-type shredder mentioned above. The rotor 18 is driven by a shaft 16. Each of the pertaining knives (not illustrated in Fig. 17) is subdivided into three portions which are arranged in accordance with Fig. 15. Consequently, the device has three axially consecutive annular portions 12a', 12b', 12c'. The rotor shell 18 is equipped with pre-slitters 17 which notch the material Z transverse to the direction of fiber growth on the borderlines between the annular rotor portions 12a', 12b' and 12c'. Since the shell 18, according to the foregoing explanation, is so designed that the border circles between the three annular portions have the same diameter as the two cylindrical end portions of the shell, the foregoing description relating to the adaptation of the pre-slitter position to the shape and position of the three partial knife zones is fully applicable. This applies also to "open"-type machines corresponding in other respects to the machine shown in Fig. 17. If additional pre-slitters are provided within the axial range of the respective annular knife zones, these pre-slitters are to be mounted in proper relation to the shape of the annular zones as will be explained in a later place with reference to the example shown in Fig. 18.

For determining the width of the particles, revolvable rollers 14 are mounted on the exterior surface of the shell 18 shown in Fig. 17. The rollers 14 are equipped with longitudinal knives 15 which pass through an opening in the shell 18. When the rollers 14, during revolution of the shredder, roll over the wood piece Z, the knives 15 notch the wood piece in the direction of fiber growth. According to a feature of the invention, the shape of the rollers 14, or rather of their respective peripheral surfaces, and the shape of the notching knives 15 is adapted to the shape of the respective annular knife zones. This is exemplified by the illustrated shapes of the rollers 14 and of the notching members 15 which correspond to the shape of the annular portions 12a', 12b', 12c'. Such rollers 14 and their matching members 15 should be given a correspondingly adapted shape also if the cutter, equipped with straight knife edges oblique to the axis of revolution, does not have a bodily closed shell for receiving the feed pressure.

Fig. 18 shows schematically and in a cross section along the axis y of rotation, the annular knife zone of a generally cylindrical cutter of the interior type whose knives (not shown in Fig. 18) extend across the total width of the annular zone and have straight edges set oblique to the axis of rotation in the sense of the knife edge 2 according to Fig. 1. For securing a desired length of the individual particles, the cutter is equipped with pre-slitters 17a which act upon the wood piece to be shredded transversely to the direction of fiber growth. The pre-slitters 17a are arranged in accordance with the shape of the annular knife zone of the rotor. If the cutter has a rotor shell designed in accordance with the invention, the pre-slitters can readily be mounted on the shell so that the shape of the annular zone is taken into account. Since this cannot be done as easily with a cutter completely free of a structural shell, the pre-slitters must be arranged in accordance with the merely geometrical shape of the annular knife zone defined by the rotation of the knives, in order to secure a uniform notching depth of all pre-slitters in the wood material during the normal operation of the machine. In this and similar cases the required arrangement of the pre-slitters can be obtained in a simple manner by attaching each series of pre-slitters, disposed ahead of the respective knives, upon a rail and by fastening the rails to the shredder in parallel relation to the slantingly set knife edges. This arrangement is schematically represented by the series of pre-slitters 17b shown in Fig. 18.

The wood pieces, cut to the proper length, are preferably fed toward the knife edges with the aid of a box structure as schematically indicated at 19 in Fig. 18. The side of the box structure facing the knives is adapted to the shape of the annular knife zone, for instance, in order to secure an accurate guidance of the wood material and for preventing a lateral escape of chips and wood remainders.

Such expedients relating to the design and/or mounting of any such accessories and auxiliaries serving for introducing the material into the shredding machine, for discharging the particle product, or for operating adjacent to the annular knife zones, may be applied in proper adaptation with any interior-type or exterior-type machine according to the invention. If such a machine is equipped with a rotor shell not serving as an abutment against the feed pressure but performing some other function, for instance, that of a protective housing or of a carrier for the knives or pre-slitters (so that the thickness of the wood particles is not determined by the amount of radial projection of the knife edges from the peripheral surface), it is in some cases nevertheless advantageous to give such a shell also a shape according to the invention.

It will be obvious to those skilled in the art, upon a study of this disclosure, that my invention permits of various modifications other than those specifically illustrated and described, without departing from the essential features of my invention and within the scope of the claims annexed hereto.

I claim:

1. A cutter head for shredding pieces of wood, comprising a rotor having a portion shaped as a body of revolution, said portion having a curved generatrix, a set of knife blades of substantially plane shape disposed on the peripheral surface of said rotor portion and projecting therefrom for severing particles from the wood to be shredded, each of said blades having a straight cutting edge extending oblique to the axis of said rotor and intersecting any chosen axial plane of said rotor at an acute angle, whereby the totality of said cutting edges define a substantially hyperbolic envelope curve in said axial plane, with said generatrix being parallel to said envelope curve.

2. A cutter head for shredding pieces of wood, comprising a rotor having a portion shaped as a body of revolution, said portion having a concave generatrix, a set of plane knife blades disposed on the peripheral surface of said rotor portion and projecting away from the outside of said rotor, each of said blades having a straight cutting edge extending oblique to the axis of said rotor and intersecting any chosen axial plane of said rotor at an acute angle, whereby the totality of said cutting edges define a substantially hyperbolic envelope curve in said axial plane, with said generatrix being parallel to said envelope curve.

3. In a cutter head according to claim 1, said rotor being hollow, and said blades projecting inwardly into the hollow of said rotor.

4. A cutter head, comprising a plurality of annular rotor portions each having a separate generatrix of curved shape and each having a set of straight-edge knife blades as set forth in claim 1, said rotor portions being coaxial and immediately adjacent to each other, and said knife blades of respectively different rotor portions extending conjointly over the axial width of the totality of said rotor portions and having all the same oblique angle relative to the rotor axis.

5. A cutter head according to claim 4, comprising slitter members for transversely pre-slitting the wood pieces, said slitters being disposed on border circles between adjacent rotor portions.

References Cited in the file of this patent

UNITED STATES PATENTS

| | | |
|---|---|---|
| 80,363 | Mosser | July 28, 1868 |
| 399,107 | Winter | Mar. 5, 1889 |
| 953,359 | Tainter et al. | Mar. 29, 1910 |
| 978,414 | Vivarttas | Dec. 13, 1910 |
| 1,194,865 | Muller | Aug. 15, 1916 |
| 1,495,067 | Conklin | May 20, 1924 |
| 1,778,769 | Olson | Oct. 21, 1930 |
| 1,815,324 | Olson | July 21, 1931 |
| 1,834,034 | Norton et al. | Dec. 1, 1931 |
| 2,453,797 | Johnson | Nov. 16, 1948 |
| 2,608,225 | Kidder | Aug. 26, 1952 |